July 14, 1953 — H. F. PRASSE — 2,645,536
FLEXIBLE PISTON RING
Filed Jan. 24, 1950
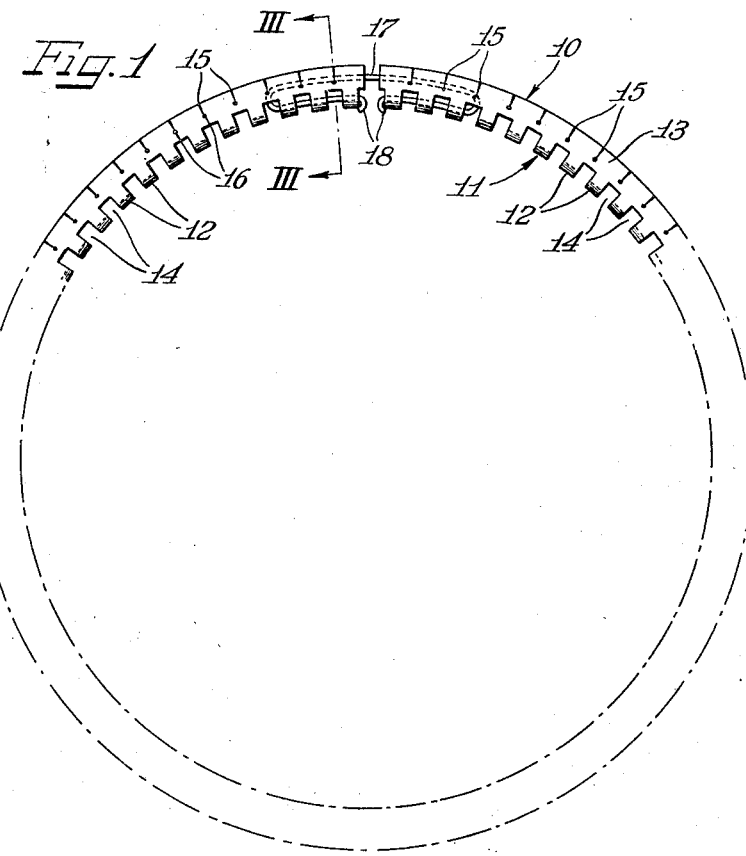
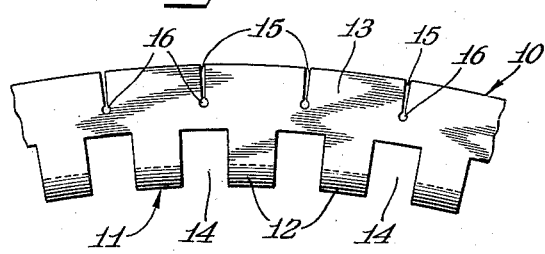
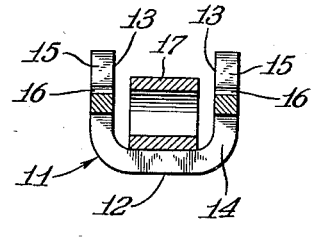
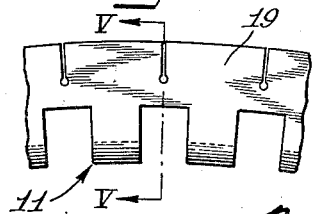
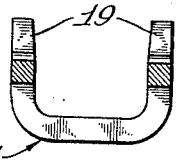
Inventor
Herbert F. Prasse
by Attys

UNITED STATES PATENT OFFICE 2,645,536

FLEXIBLE PISTON RING

Herbert F. Prasse, Gates Mills, Ohio, assignor to Thompson Products, Inc., Cleveland, Ohio, a corporation of Ohio Application January 24, 1950, Serial No. 140,300

7 Claims. (Cl. 309—45)

This invention relates to improvements in piston rings and more particularly relates to an improved oil control piston ring which may be made from strip steel.

It has heretofore been a common practice to construct oil control piston rings which have a plurality of vertically spaced circumferential oil scraping edges bearing against the wall of a cylinder during reciprocation of a piston therein. The space between the oil scraping edges serves as a reservoir for collecting oil removed from the cylinder wall by the scraping edges, and oil passages through the web or back of the ring connect this space with the back of the piston ring groove and return the oil through radial openings in the piston leading to the crankcase. Such oil control piston rings have also been formed from continuous strip steel by a series of blanking, forming and heat treating operations followed by relatively difficult and expensive finishing operations.

In accordance with my present invention, I provide a plurality of scraping edges or scavenger elements but stop these elements short of the oil passages of the ring, so as to provide a relatively rigid semi-segmental type of scavenger element construction having sufficient flexibility to enable the ring to conform to the cylinder wall, but being rigid enough to permit the ring to be finished with the same kind of tooling as is used on standard type cast iron rings.

The principal object of my invention is to provide a simple and improved form of oil control piston ring which may be made from strip steel and may be machined in the same manner as standard types of cast iron piston rings.

A further object of my invention is to provide a new and improved form of oil control piston ring which may be inexpensively made from strip steel and which is so constructed as to eliminate many of the manufacturing difficulties heretofore encountered in the manufacture of piston rings from continuous strip stock.

A still further object of my invention is to provide a simple, cheap, efficient and easily installed oil control piston ring maintaining a plurality of scavenger elements in vertically and circumferentially spaced relation within a cylinder during all positions which may be assumed by the piston ring in operation in a cylinder.

These and other objects of my invention will appear from time to time as the following specification proceeds and with reference to the accompanying drawing wherein:

Figure 1 is an enlarged fragmentary plan view of a flexible oil piston ring constructed in accordance with my invention;

Figure 2 is an enlarged fragmentary plan view of the ring shown in Figure 1;

Figure 3 is a transverse sectional view taken substantially along line III—III of Figure 1;

Figure 4 is an enlarged fragmentary view showing a modified form in which my invention may be embodied; and Figure 5 is a transverse sectional view taken substantially along line V—V of Figure 4.

Referring now more particularly to the drawing illustrating a preferred embodiment of oil control ring constructed in accordance with my invention, numeral 10 indicates an oil control ring made up from flat strip steel stock and having a web 11 of a ladder-like form having cross bars 12—12 connecting parallel annular scraping or scavenger flanges 13—13 together. Transverse slots 14—14 between the cross bars 12—12 form oil passages extending radially of the ring and connecting the channel of the ring formed between the flanges 13—13 with the back of the annular piston ring groove formed in the piston (not shown), to return oil to the crankcase through the oil return passages in the piston.

The piston ring may be formed from flat strip stock of tool steel, such as S. A. E. 1095 containing 0.95% carbon which may be hardened after the blanking and forming operations thereof. In order to impart flexibility to the ring without forming separate segments, a series of equally spaced slits or cuts 15—15 are made in the flanges 13—13 from the outer sides thereof, the slits on opposite flanges preferably being aligned and registering with the centers of the slots 14—14. The slits 15—15 may be made in the flat strip during the blanking operation, before formation of the ring in a circular form of U-shaped cross-section.

In order to relieve the inner ends of the slits 15—15 and the flanges 13—13 from undue stresses, the slits 15—15 are herein shown as terminating in circular holes 16—16, which may be placed in the flat strip either during or just prior to the cutting or slitting operation. It should here be noted, however, that while I have shown the slits 15—15 relieved by the circular holes 16—16 that said holes need not be circular, and need not be in all sizes and types of rings, but are considered to be especially desirable for the smaller diameter rings. It should further be noted that in Figure 2 the slits 15—15 are exaggerated and shown as being of a substantially V-shaped formation by reason of the spreading apart of the scraping edges when forming the ring to a circular form.

In the form of my invention shown in Figures 4 and 5, I show a fragment of a ring much like the piston ring shown in Figure 1. This ring, however, has flanges 19 which are thinned and elongated toward their outer edges. This may be done during the operation of forming the ring by a rolling operation after slitting of the flanges and makes opposite sides of the slits substantially parallel when the strip is formed to the annular circular form it will assume when in the piston and cylinder of an internal combustion engine.

In order to give the ring the correct wall pressure against the walls of the cylinder an expander may be carried in the channel between the flanges 13—13 to yieldably force the ends of the ring apart. As herein shown, I preferably use a leaf-type expander 17 of a substantially looped-shaped formation substantially conforming to the radius of curvature of the ring and having an open inner central portion, the adjacent ends of which are outturned, as indicated by reference character 18, to engage the adjacent ends of the adjacent cross bars 12—12, and yieldably force the ends of the ring apart.

It may be seen from the foregoing that an improved oil control piston ring has been provided, which is cheap to manufacture, and is of an efficient and of durable construction. It may further be seen that the ring may be formed from flat strip steel stock and has a plurality of vertically spaced circumferential scavenging surfaces slidably engaging the walls of the cylinder and wiping the oil therefrom, for return to the crankcase through the oil return passageways formed in the ring and piston, and that these wiping surfaces are formed and flexibility of the ring is attained by slitting the ring radially at a plurality of equally spaced points partially through the flanges thereof, rendering the ring sufficiently flexible to conform to the form of the cylinder, but rigid enough to permit the ring to be finished after the blanking, forming and heat treating operations by the same type of tooling used to finish standard types of cast iron piston rings. It may further be seen that the ring of my invention affords far a simpler oil control ring than heretofore and provides a more accurate oil control ring which may be made from flat strip steel stock, but which retains the desirable features of cast iron piston rings.

It will be understood that modifications and variations may be effected without departing from the scope of the novel concepts of the present invention.

I claim as my invention:

1. A piston ring comprising a slotted annular web having spaced annular flanges extending from opposite sides thereof, and a plurality of circumferentially spaced radial slits in said flanges opening to the outer periphery of the ring and terminating outwardly from said slots and imparting flexibility to the ring.

2. A piston ring comprising a slotted annular web having spaced annular flanges extending from opposite sides thereof, and a plurality of vertically registering circumferentially spaced slits in said flanges extending inwardly from the outer sides thereof and terminating outwardly from the slots of the web, and said slits imparting flexibility to the ring.

3. A piston ring comprising a slotted annular web having parallel spaced annular flanges extending from opposite sides thereof, and a plurality of vertically registering circumferentially spaced slits extending radially into said flanges and terminating in substantially circular apertures spaced inwardly of the inner sides thereof.

4. A piston ring comprising a slotted annular web having parallel spaced annular flanges extending from opposite sides thereof, and a plurality of vertically registering circumferentially spaced slits extending radially into said flanges from the outer sides thereof and terminating in substantially circular apertures extending through said flanges inwardly of the inner margins thereof.

5. An oil control piston ring having an annular web with parallel spaced annular flanges extending outwardly from opposite sides thereof, said web having a plurality of radially extending circumferentially spaced oil return slots formed therein and extending partially into said flanges from the inner sides thereof, and a plurality of circumferentially spaced slits extending partially through said flanges from the outer sides thereof in alignment with, but stopping short of said slots.

6. An oil control piston ring having an annular web with parallel spaced annular flanges extending outwardly from opposite sides thereof, said web having a plurality of radially extending circumferentially spaced oil return slots formed therein and extending partially into said flanges from the inner sides thereof, and a plurality of vertically registering circumferentially spaced slits extending radially into said flanges from the outer sides thereof toward said slots in alignment therewith but terminating short of said slots.

7. An oil control piston ring having an annular web with parallel spaced annular flanges extending outwardly from opposite sides thereof, said web having a plurality of radially extending circumferentially spaced oil return slots formed therein and extending partially into said flanges from the inner sides thereof, said flanges having a plurality of vertically registering uniformly spaced apertures extending therethrough, inwardly of the outer sides thereof and in alignment with said slots, and also having a plurality of spaced slits extending radially into said flanges from the outer sides thereof and terminating at their inner ends in said apertures.

HERBERT F. PRASSE.

References Cited in the file of this patent

UNITED STATES PATENTS

| Number | Name | Date |
| --- | --- | --- |
| 2,183,199 | Lutz | Dec. 12, 1939 |
| 2,267,322 | Bowers | Dec. 23, 1941 |
| 2,273,691 | Bowers | Feb. 17, 1942 |
| 2,346,899 | Bowers | Apr. 18, 1944 |